Aug. 4, 1925.
F. A. WALKER
1,548,400
CLEANING OUTLET FOR OIL STORAGE TANKS
Filed July 28, 1923
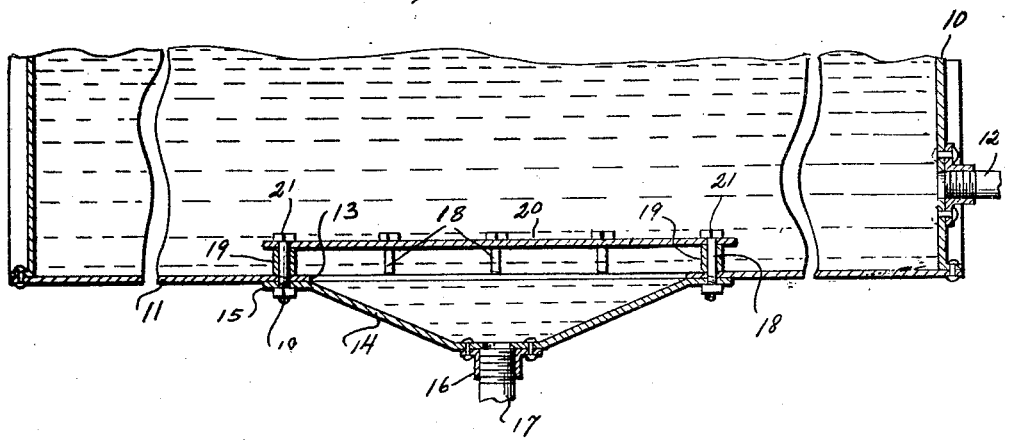
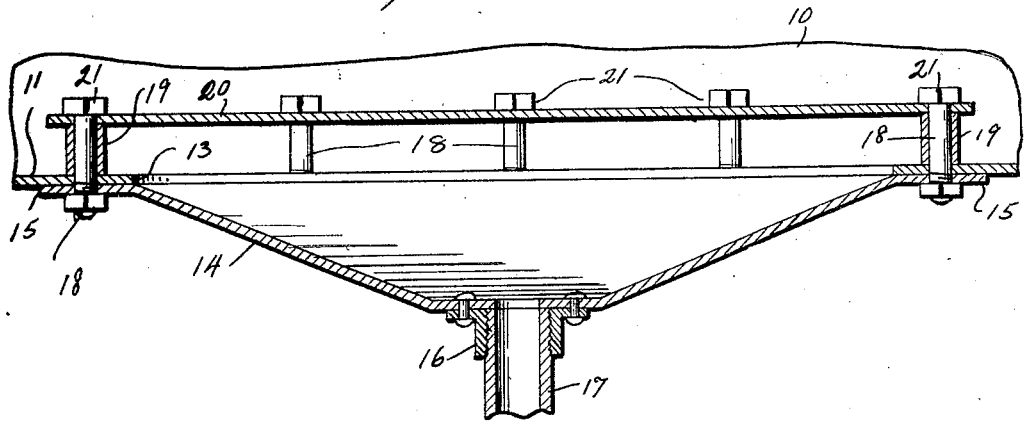
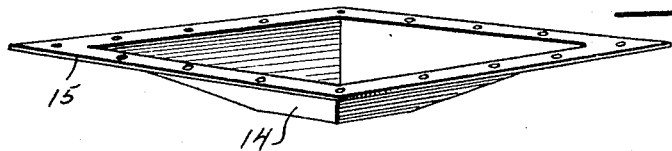
INVENTOR.
Frank A. Walker
BY Watson E. Coleman
ATTORNEY.

Patented Aug. 4, 1925.

1,548,400

UNITED STATES PATENT OFFICE.

FRANK A. WALKER, OF WICHITA FALLS, TEXAS, ASSIGNOR OF ONE-HALF TO CLETUS C. CONNOLLY, OF WICHITA FALLS, TEXAS.

CLEANING OUTLET FOR OIL-STORAGE TANKS.

Application filed July 28, 1923. Serial No. 654,397.

*To all whom it may concern:*

Be it known that I, FRANK A. WALKER, a citizen of the United States, residing at Wichita Falls, in the county of Wichita and State of Texas, have invented certain new and useful Improvements in Cleaning Outlets for Oil-Storage Tanks, of which the following is a specification, reference being had to the accompanying drawings.

This invention relates to oil storage tanks, and particularly to means whereby the sediment, water or other foreign matter which collects at the lower end of the oil tank may be drawn off.

Oil tanks at the present time have extending from the bottom of the tank a two-inch pipe whereby to bleed the salt water and basic sediment which accumulates in the lower portion of the tank. According to the rules of the Railroad Commissioner of Texas, which rules are more or less like the rules of other oil producing States, the basic sediment in tank bottoms must be six inches below the oil drain pipe, that is the drain pipe for the clean oil, but oftentimes, particularly under rush conditions, the basic sediment increases so within the oil tank that it rises above the six inches and the sediment is liable to run off through the pipe line.

Under these circumstances where this basic sediment is higher than the amount allowed, the pipe line companies refuse to run the oil, which is a great inconvenience to the producer. A tank is very rarely empty in the oil field, and even when it is empty it is but a matter of a few hours until it will be needed again. The tank, therefore, does not get very much chance to be cleaned out. This is particularly true where producers swab their wells to get the flush production, this swabbing operation cutting the oil and making it dirty. This dirty oil is then left in the storage tanks to settle out and this causes a sediment to accumulate on the bottom of the tank to a depth greater than that permitted by the rules. In order to clean the tanks they are opened at the manhole plate in the side adjacent the bottom and when the tanks are cleaned a large amount of oil is wasted.

The general object of this invention is to provide a cleaning outlet for oil tanks which will permit the ready discharge of sediment from the bottom of the oil tank and of water collected therein and which will thus prevent any chance of the sediment increasing in depth to a point equal to or above the outlet pipe for the clean oil.

A further object is to provide a construction of this character which can be applied in a very short time to any tank and which will keep the tank in first-class shape at all times, thus saving the oil which is wasted by manually cleaning out the tank, as well as saving the labor involved therein.

A still further object is to provide a device of this character which will permit a "bleeding out" of the sediment every day and thus permit a gauge of the oil produced per day.

Other objects will appear in the course of the following description.

My invention is illustrated in the accompanying drawings, wherein:—

Figure 1 is a vertical section through an oil tank showing my improved cleaning outlet;

Figure 2 is an enlarged sectional view through the cleaning outlet;

Figure 3 is a fragmentary perspective view of the member 14.

Referring to these drawings, 10 designates an oil tank of any ordinary or suitable construction having a bottom 11 and having the outlet pipe 12. The center of the bottom is cut away to form an opening 13. This opening may be square, round, or any other shape and in a 250-barrel tank, for instance, will be approximately two feet square.

Disposed below the bottom 11 and beneath this opening 13 is a pan 14, this pan having a marginal flat flange 15 and from this flange extending downwardly and centrally. Bolted or otherwise attached to the lowest portion of the pan is an annulus 16 or pipe coupling to which an outlet pipe 17 is connected. This pan 14 is held in place by bolts 18 extending through the flat margin 15 of the pan, and surrounding certain bolts are sleeves 19, which sleeves are in practice about half an inch high. Resting upon these sleeves is a baffle plate 20 which is approximately two feet square and which is perforated at the corners for the reception of the bolts 18. Nuts 21, of course, are placed on these bolts and bear against the baffle plate and hold the baffle plate down against the sleeves. There will thus be left between the baffle plate and the bottom a space of about one and a half inches. This baffle plate 20 prevents any swirlpool being formed in the oil when the sediment and salt water is being withdrawn and makes the bleeder, as this whole device may be called, draw from under its edges not more than one and a half inches from the bottom of the tank. It will be seen that whereas an ordinary tank is bled through a two-inch pipe disposed at the center of the tank, the tank with my device applied thereto is bled from an opening one and a half inches high and eight feet long, that is the opening on each of the four sides of the bleeding device. This construction will permit the very rapid cleaning of the tank without any storing up of the sediment and without any merchantable oil being lost. Of course, it will be understood that the size of the pan 14 and the size of the plate 20 and the size of the opening 13 will depend upon the size of the tank.

It will be seen that this tank cleaner can be applied in a very short time and the tank kept in first-class shape at all times, thus saving the oil which is ordinarily wasted by the tank cleaning operation.

While I have illustrated a tank cleaning device for drawing off the sediment and water in the tank which I believe to be thoroughly effective, I do not wish to be limited thereto, as it is obvious that many changes might be made in the details of construction and arrangement of parts without departing from the spirit of the invention.

I claim:—

A sediment collecting and clean out device for storage tanks, comprising the combination with a tank provided in its bottom with an opening, of a frusto-pyramidal pan, located beneath the opening, a discharge pipe extending downwardly from the center of the pan, a baffle plate within the tank above the opening and of a size to project beyond all the edges of the opening, a plurality of bolts passing through the baffle plate, the tank bottom and the pan edges for securing the pan in place and holding the baffle plate, and sleeves surrounding certain of the bolts and interposed between the bottom of the tank and the baffle plate for maintaining the latter in spaced relation to the bottom of the former.

In testimony whereof I hereunto affix my signature.

FRANK A. WALKER.